(12) United States Patent
Roddy et al.

(10) Patent No.: US 10,214,249 B2
(45) Date of Patent: Feb. 26, 2019

(54) ROOF ATTACHMENT METHOD FOR AN APPLIED COMPOSITION ROOF

(71) Applicant: MAGNA EXTERIORS INC., Concord (CA)

(72) Inventors: Stephen R. Roddy, Harrison Township, MI (US); Ameil A. Kapadia, Shelby, MI (US); Mark C. Martin, Royal Oak, MI (US); Matthew R. Plauman, New Baltimore, MI (US)

(73) Assignee: Magna Exteriors Inc., Concord (CA)

( * ) Notice: Subject to any disclaimer, the term of this patent is extended or adjusted under 35 U.S.C. 154(b) by 0 days.

(21) Appl. No.: 15/309,092

(22) PCT Filed: May 6, 2015

(86) PCT No.: PCT/US2015/029472
§ 371 (c)(1),
(2) Date: Nov. 4, 2016

(87) PCT Pub. No.: WO2015/171767
PCT Pub. Date: Nov. 12, 2015

(65) Prior Publication Data
US 2017/0073021 A1    Mar. 16, 2017

Related U.S. Application Data

(60) Provisional application No. 61/989,182, filed on May 6, 2014.

(51) Int. Cl.
*B60R 13/07* (2006.01)
*B62D 27/02* (2006.01)
(Continued)

(52) U.S. Cl.
CPC ............ *B62D 27/026* (2013.01); *B60R 13/04* (2013.01); *B62D 25/06* (2013.01); *B62D 29/043* (2013.01)

(58) Field of Classification Search
CPC ......... Y02E 10/47; Y02B 10/20; Y02B 10/12; H02S 20/23; F24S 25/61; B60R 13/04;
(Continued)

(56) References Cited

U.S. PATENT DOCUMENTS 2,015,020 A * 9/1935 Rowe .................. E04D 1/12
52/546
2,748,645 A * 6/1956 Peckham .............. F16B 5/06
24/703.1

(Continued)

FOREIGN PATENT DOCUMENTS

| CN | 1922053 A | 2/2007 |
| CN | 101920647 A | 12/2010 |

(Continued)

OTHER PUBLICATIONS

International Search Report for International Application No. PCT/US2015/029472, dated Jul. 17, 2015.

*Primary Examiner* — Kiran B Patel
(74) *Attorney, Agent, or Firm* — Warn Partners, P.C.

(57) ABSTRACT

A roof attachment system and method for connecting a composite molded roof to a vehicle body structure, having a plurality of mounting members that each create a C-like section part that is shaped to match the inside surface of the composite Class A roof. The mounting member is bonded to the roof panel with adhesive. The roof is aligned with key features to locate the roof within an opening, where the mounting member is then also bonded to the body structure with adhesive.

8 Claims, 4 Drawing Sheets

(51) Int. Cl.
  *B62D 25/06*  (2006.01)
  *B62D 29/04*  (2006.01)
  *B60R 13/04*  (2006.01)

(58) Field of Classification Search
  CPC ...... C08L 63/00; C08L 71/02; C08L 2666/02;
  C08L 2666/18
  USPC .................................. 296/210, 1.08, 213
  See application file for complete search history.

(56) References Cited

U.S. PATENT DOCUMENTS

| | | | | |
|---|---|---|---|---|
| 4,092,766 | A * | 6/1978 | Meyer | F16B 5/121 24/295 |
| 4,618,181 | A * | 10/1986 | Tokuda | B62D 25/07 219/91.2 |
| 5,318,338 | A * | 6/1994 | Ikeda | B62D 25/06 296/203.03 |
| 5,495,694 | A * | 3/1996 | Kuhns | E04D 13/076 52/11 |
| 5,540,478 | A * | 7/1996 | Schuch | B60J 7/04 224/331 |
| 5,783,298 | A * | 7/1998 | Herring, Jr. | B21D 39/021 137/268 |
| 5,829,825 | A * | 11/1998 | Kim | B60R 13/04 296/210 |
| 5,948,508 | A * | 9/1999 | Pastore | B60R 13/04 428/156 |
| 6,030,701 | A * | 2/2000 | Johnson | B32B 7/12 428/343 |
| 6,419,305 | B1 * | 7/2002 | Larsen | B62D 25/04 296/187.02 |
| 6,945,592 | B1 * | 9/2005 | Hui | B60R 13/04 296/187.01 |
| 6,974,181 | B2 * | 12/2005 | Mikkaichi | B60R 13/04 296/210 |
| 7,004,536 | B2 * | 2/2006 | Wieber | B62D 25/06 296/146.6 |
| 7,234,766 | B2 * | 6/2007 | Uchida | B60R 9/058 296/210 |
| 7,438,782 | B2 * | 10/2008 | Sheasley | C09J 5/06 156/293 |
| 7,838,589 | B2 * | 11/2010 | Finerman | B05D 3/108 522/100 |
| 8,424,961 | B2 * | 4/2013 | Carsley | B62D 25/06 296/193.12 |
| 9,248,864 | B2 * | 2/2016 | Eberle | B60R 9/04 |
| 9,428,225 | B2 * | 8/2016 | Minei | B62D 27/026 |
| 9,440,683 | B1 * | 9/2016 | Donabedian | B62D 27/023 |
| 9,676,426 | B1 * | 6/2017 | Hinz | B62D 29/00 |
| 2002/0101096 | A1 * | 8/2002 | Nagasawa | B60R 13/04 296/210 |
| 2004/0197571 | A1 * | 10/2004 | Hiroshige | B32B 27/38 428/424.2 |
| 2004/0221953 | A1 * | 11/2004 | Czaplicki | B62D 29/002 156/293 |
| 2005/0189792 | A1 * | 9/2005 | Unger | B60R 9/04 296/210 |
| 2005/0230027 | A1 * | 10/2005 | Kassa | C08G 18/10 156/79 |
| 2007/0057537 | A1 * | 3/2007 | Barutzky | B62D 25/06 296/210 |
| 2007/0158965 | A1 * | 7/2007 | Van Smirren | B60R 9/04 296/3 |
| 2007/0283996 | A1 * | 12/2007 | Hachtmann | H02S 20/23 136/244 |
| 2008/0277973 | A1 * | 11/2008 | Mourou | B60R 13/04 296/210 |
| 2009/0188198 | A1 * | 7/2009 | Scroggie | B60R 13/04 52/716.7 |
| 2010/0199593 | A1 * | 8/2010 | Mourou | B60R 13/0206 52/716.7 |
| 2012/0068488 | A1 * | 3/2012 | Mourou | B60R 13/0206 296/1.08 |
| 2013/0328350 | A1 * | 12/2013 | Magnusson | B62D 29/048 296/187.02 |
| 2016/0176274 | A1 * | 6/2016 | Lange | B60J 10/32 296/210 |
| 2017/0036706 | A1 * | 2/2017 | Donabedian | B62D 27/023 |

FOREIGN PATENT DOCUMENTS

| | | |
|---|---|---|
| DE | 20120025 U1 | 5/2002 |
| DE | 10249405 A1 | 5/2004 |
| WO | 2013153056 A1 | 10/2013 |

* cited by examiner

ROOF ATTACHMENT METHOD FOR AN APPLIED COMPOSITION ROOF

CROSS-REFERENCE TO RELATED APPLICATIONS

This application is a National Stage of International Application No. PCT/US2015/029472, filed May 6, 2015, which claims priority benefit to U.S. Provisional Patent Application No. 61/989,182, filed May 6, 2014 The disclosures of the above applications are incorporated herein by reference.

FIELD OF THE INVENTION

The present invention relates to an attachment assembly and method of attaching a roof to a vehicle body structure to minimize the appearance of a body to roof gap.

BACKGROUND OF THE INVENTION

Typical composite roofs are bonded to the vehicle side door ring assembly by means of adhesive and mechanical fasteners using an attaching flange at the vehicle structure interface. This interface is generally not a desired exterior "Class A" surface, but exists below or is hidden from the desired show surface. The creation of this depression and flat flange construction results in a second component being required in order to cover the "Ditch" that is created on both sides of the vehicle to try to achieve the desired exterior surface appearance. In automotive use today, multiple versions of molded, stamped, roll formed or extruded second components are used to fill in this ditch. The term "roof ditch molding" is generally used to describe these components.

Typical bonded joint constructions used for attachment of the roof to body side ring structure of the vehicle in the ditch receive the inserted roof ditch molding. These parts are subject to several quality and appearance concerns due to the tolerances involved in the build of the components and all the parts required to install and hold the parts in place.

Accordingly, there exists a need for a system and method to eliminate use of roof ditch moldings, while avoiding the appearance of the large joint in the exterior vehicle surface and managing variable offsets from the desired Class A surface appearance to vehicle body structure flanges.

SUMMARY OF THE INVENTION

The present invention is directed to a roof attachment system and method for connecting a composite roof to a vehicle body structure. The roof attachment is suitably configured to accommodate the body side structure to roof gap and mass requirements. There is provided at least one mounting bracket or member that creates a C section or other suitable predetermined cross section part depending on the application that is shaped to generally match the inside of the composite Class A roof attachment portion where the mounting bracket is bonded to the roof panel with adhesive. The roof is aligned with locating features provided on the body side structure to position the roof within an opening, where the mounting member becomes bonded to the body structure with adhesive. A reduced or smaller gap than conventionally possible is left between the roof panel and the body side structure, e.g., vehicle side door ring structure. An edge trim closes off the gap therebetween and is held in place by adhesive and/or frictional engagement. The present invention thereby creates an attachment arrangement and method in combination with desired exterior show appearance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
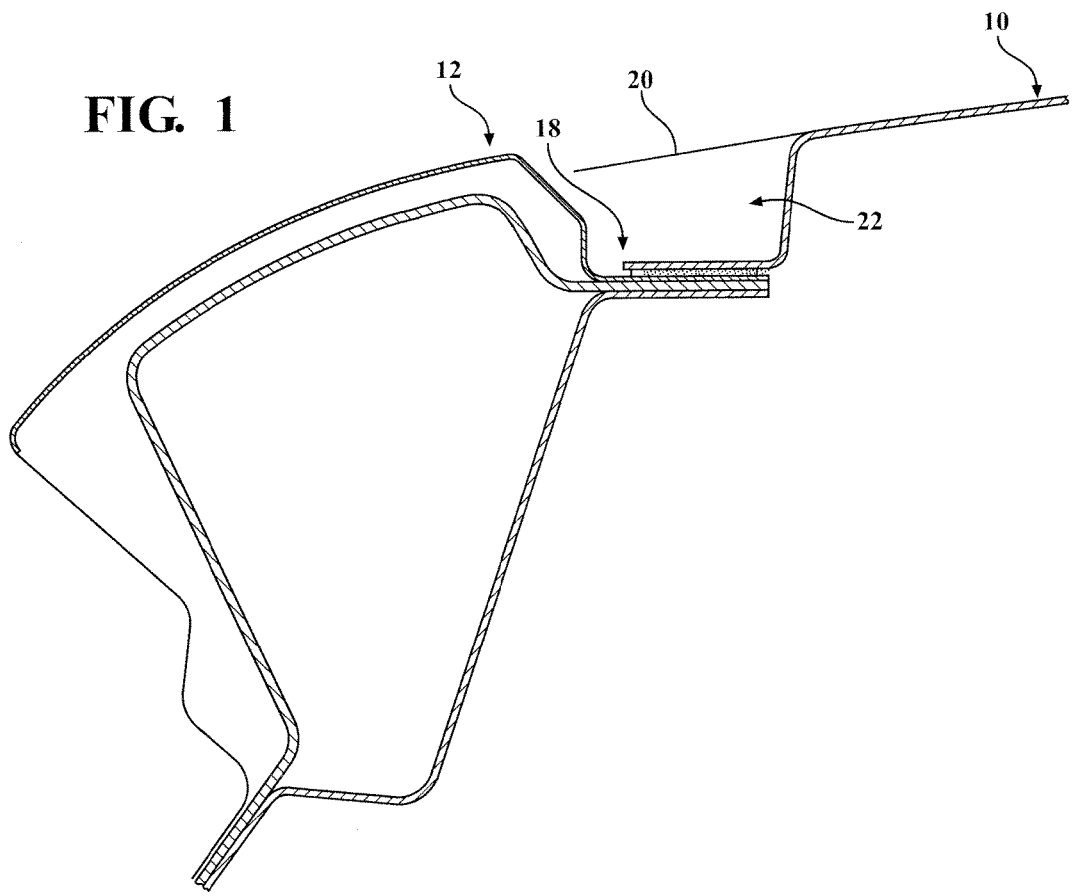
FIG. 1 is a cross-sectional elevation view of a typical joint bonding a composite roof to a body side ring assembly.
Figure 2:
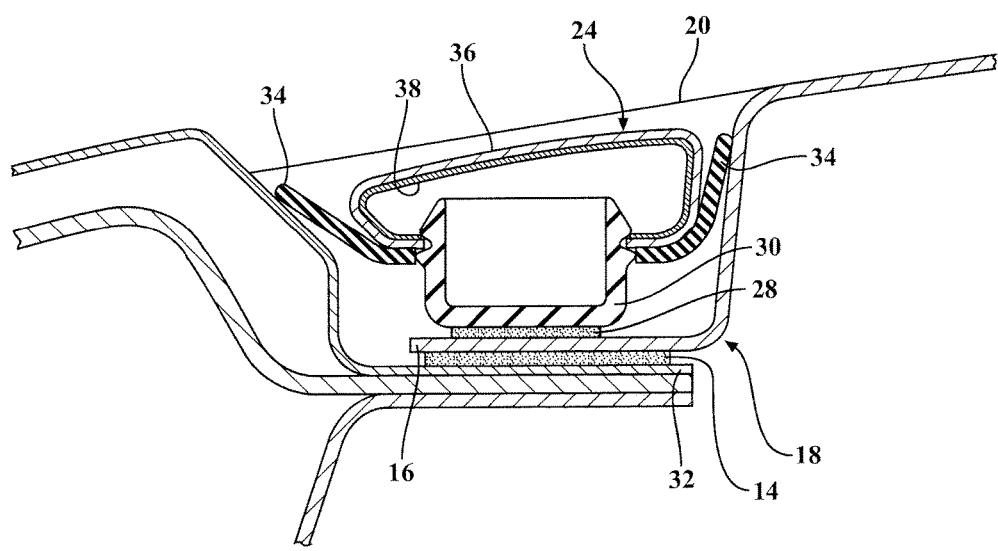
FIG. 2 is an enlarged cross-sectional elevation view of the typical joint of FIG. 1 with the addition of an inserted roof ditch molding.
Figure 3:
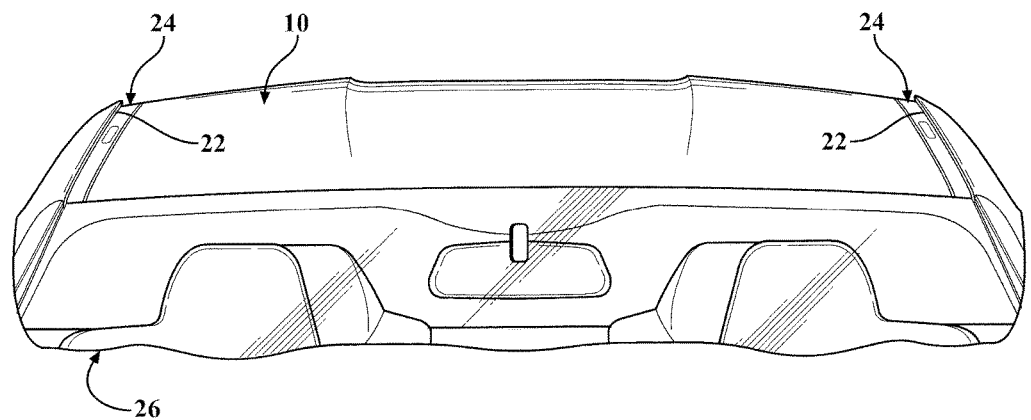
FIG. 3 is a front elevation view of a vehicle having the typical roof ditch moldings inserted in a gap between the composite roof and body side.

Referring to FIGS. 1-3, the advantages of the present invention are over prior art as shown. A prior art composite roof shown generally at 10 is connected to a vehicle side door ring assembly indicated generally at 12 by means of adhesive 14 and mechanical fasteners or some other attachment mechanism using an attaching flange 16 at a vehicle structure interface shown generally at 18. This interface is generally not a desired exterior Class A surface, but exists below or is hidden from the desired show surface plane indicated at 20. The creation of this depression indicated generally at 22 and flat flange construction necessitates a second part to cover the "ditch" that is created to improve appearance. Since a ditch 22 is created on each side of the composite roof 10, each ditch 22 needs at least one of these second parts to cover the respective ditch. In automotive use today, multiple versions of molded, stamped, roll formed or extruded products are used to fill in this ditch 22. The term "roof ditch molding" is generally used to describe these components.

The composite roof 10 Class A surface is positioned interior to the side door ring 12 Class A visible surface at a distance that provides a gap therebetween. The gap distances can vary but is generally enough distance to have undesirable appearance.

FIG. 1 shows a typical bonded joint construction 18 for attachment of the composite molded roof 10 to an aluminum or steel body side ring assembly 12. FIG. 2 shows the same construction with a molding section (roof ditch molding) shown generally at 24 located in the ditch 22 to simulate something close to the original design intent surface with respect to the desired exterior Class A visible surface 20. These parts are subject to several quality and appearance concerns due to the tolerances involved in the build of the components and all of the parts required to install and hold the parts in place. Thus, the present invention is an improvement over the prior art because a more aesthetically pleasing appearance can be achieved due to the tighter fit and reduced gap between the composite molded roof and steel body side ring assembly, as will be described in greater detail below.

Adhesive 28 attaches a base portion 30 of the molding section 24 to the top of the attaching flange 16 located at the bottom of the ditch 22. A second flange portion 32 of the body side ring assembly 12 is connected to the bottom of the attaching flange 16 with the adhesive 14. A pair of wings 34 are connected to the base portion 30, e.g., insert molded, to secure the molding section 24 against sidewalls of the ditch 22. An upper molded member 36 is connected to the base portion 30, e.g., insert molded, to the base portion 30 with a cross-section to simulate original design intent class A visible surface. A metal insert 38 or other structural feature is provided for stiffening.

FIG. 3 illustrates a vehicle 26 with typical prior art roof ditch moldings 24 located to the left and right side of the composite molding roof 10.

Moving now to the present invention, the present invention generally accounts for and manages variable offsets from the desired Class A surface to the body structure flanges. Typically, vehicle body to roof gap and mass versus cost of the system drives design consideration decisions. Dependant on the application, it is within the scoop of the present invention that the roof attachment is suitably configured to accommodate the body structure to roof gap and mass requirements.

Figure 4:
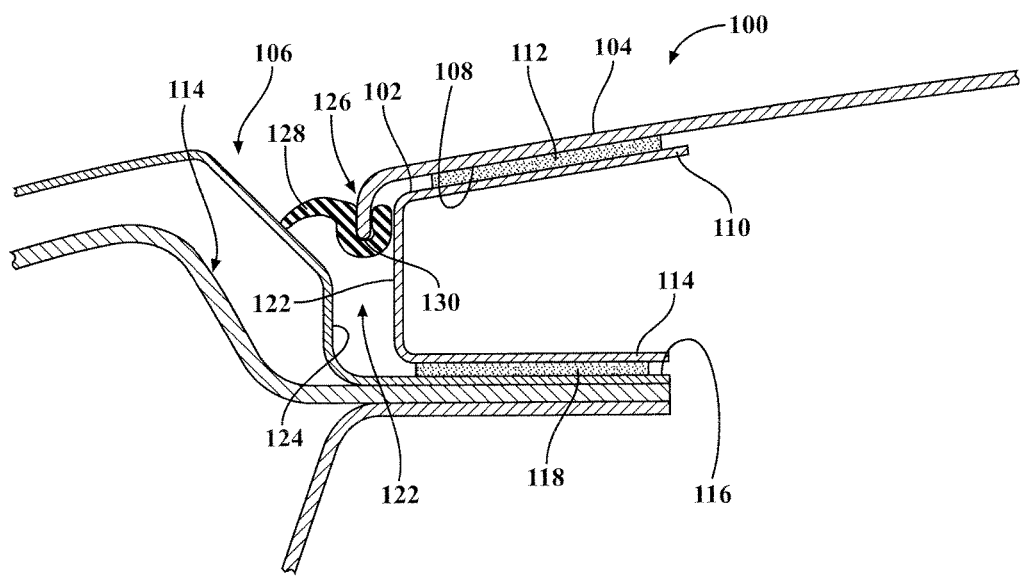
FIG. 4 is a cross-sectional elevation view of an exemplary composite roof and body structure with a roof attachment assembly affixed thereto, in accordance with the present invention.
Figure 5:
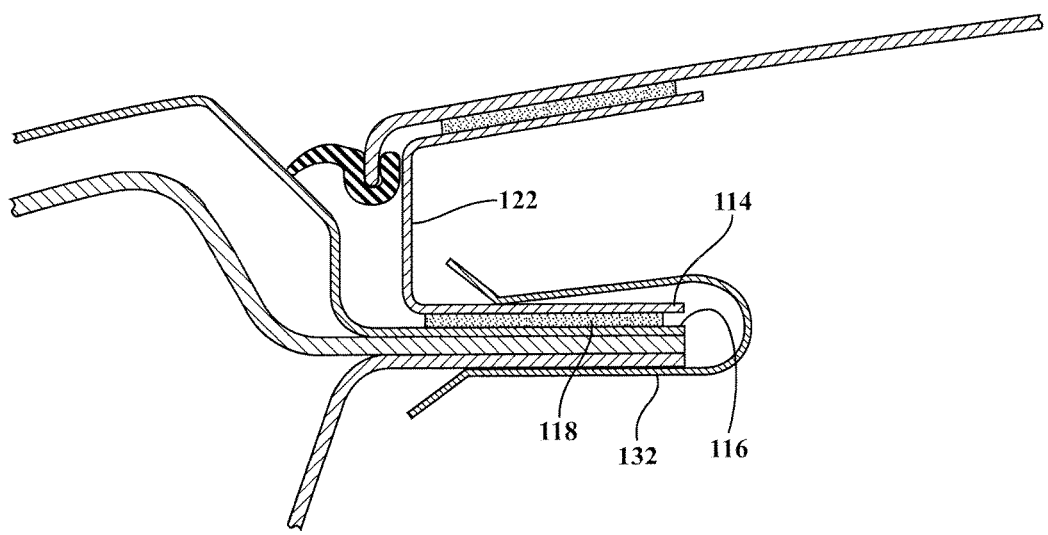
FIG. 5 is a cross-sectional elevation view of the composite roof, body structure, and roof attachment assembly of FIG. 4 with a retention clip, in accordance with the present invention.
Figure 6:
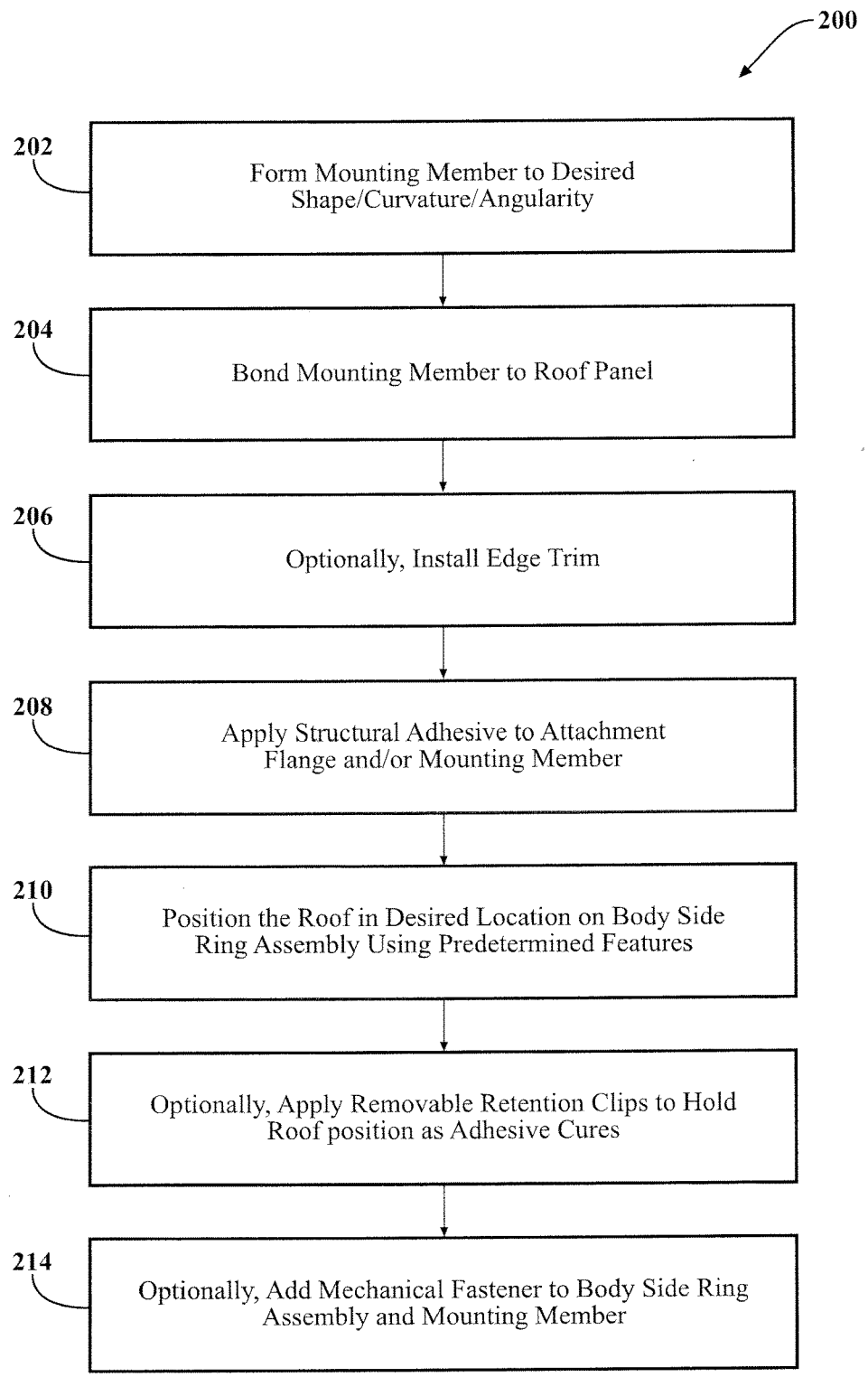
FIG. 6 is a flowchart illustrating exemplary steps in a roof attachment method, in accordance with the present invention.

Referring to the FIGS. 4-6, which are the Figs. of the embodiments of the present invention generally, there is provided a roof attachment system and method according to the present invention shown generally at 100, 200. FIGS. 4-5 show a mounting member or bracket 102 connecting a composite molded roof 104 to a body side ring assembly 106, in accordance with a first embodiment of the present invention.

The roof attachment system 100 is provided with at least one mounting member 102, preferably, plurality of mounting members 102, that is generally a "C" section-shaped component portion. The mounting member 102 is generally shaped to match the inside surface 108 of the composite Class A roof 104. Other cross-sectional shapes within the scope of the present invention are contemplated depending on the application to generally match various composite roofs and/or body side structure. The mounting member 102 has a predetermined length for engaging desired locations along the body side ring assembly, e.g., a thin section "C" channel extending substantially the length of the body side ring assembly portion adjacent the roof 104.

FIGS. 4-5 show a composite roof 104 with a roll formed metal roof mounting bracket 102. In accordance with one aspect of the present invention, if body side sheet metal is developed to be a constant offset, then the mounting member 102 is made as a uniform cross section, pull or roll formed and stretch bent to match curvature and angularity of the roof surface, e.g., the inside surface 108 of the composite roof 104.

FIGS. 4-5 depict the "C" section mounting member 102 with an upper flange 110 connected to the inside surface 108 of the roof 104 by at least structural adhesive 112 and a lower flange 114 connected to the top surface of an attachment flange 116 of the vehicle body side ring structure 106 by at least structural adhesive 118. A generally vertical portion 120 of the "C" section mounting member 102 has a predetermined height and generally partially defines one side of a smaller gap indicated generally at 122 between the "C" section mounting member 102 and at least one surface 124 of the body side ring assembly 106, e.g., surface(s) 124 being generally vertical and/or angled surfaces depending on the application.

Optionally, an edge trim or "edge gimp" 128 is provided to close out the small gap 122 remaining at the edge of the roof 104. The edge trim 128 is typically an extruded trim or molding, preferably, extruded thermoplastic elastomer (TPE), most preferably, extruded thermoplastic vulcanizate (TPV). In a preferred embodiment of the present invention, the edge trim 128 couples to a downward edge 130 of the roof 104 and extends across the gap 122 to engage the body side ring assembly 106 to close out the small gap 122.

Since the body side ring assembly 106 attachment flange 116 can vary quite significantly depending on the application, a molded or stamped mounting bracket as the mounting member 102 is preferred. In addition, since mass targets and potential read through of the bond line are considered high priorities, using carbon fiber epoxy laminate to form the mounting member 102 channel is also preferable. This mounting member 102 channel maintains a constant adhesive joint thickness along the roof 104 to channel joint (structural adhesive 112 in FIG. 4), and is targeted at the same thickness along the lower flange 114, except for areas of minimal offset increase to allow fore-aft location adjustment without interfering to the body side 106 sheet metal. The mounting member 102 preferably is a thin section "C" channel having predetermined thickness.

FIG. 5, also shows a retention clip 132 that is used to engage the positioned roof 104, as will be explained in greater detail below.

The right side attachment system assembly 100 and corresponding features are substantially mirror image/symmetrical to the left side attachment system assembly 100 and corresponding features depicted in the figures. The right side and left side meaning the roof in vehicle position.

Referring to FIG. 6, there is shown an exemplary flowchart depicting the roof attachment method 200 according to the present invention.

At 202, the mounting member 102 is formed into a desired "C" section shaped part to generally match the inside surface 108 of the composite molded roof 104. In accordance with one aspect of the present invention, if body side sheet metal is developed to be a constant offset, then the mounting member 102 is made as a uniform cross section, pull or roll formed and stretch bent to match curvature and angularity of the roof surface, e.g., the inside surface 108 of the composite roof 104. In this case, the "C" section mounting member 102 is designed to be bonded to the roof panel 104 with an outer panel portion (shown generally at 126 in FIG. 4) finished, and, optionally, the edge trim 128 used, as described in further detail below.

The mounting member 102 may be other desired predetermined cross sectional parts depending on the application to generally match the inside surface for connecting various composite molded roofs to body side ring assemblies without departing from the scope of the present invention.

At 204, structural adhesive 112 is applied to the inside surface 108 and/or the upper flange 110 and the mounting member 102 is bonded to the roof panel 104 at a predetermined location on the inside surface 108. At 206, optionally, the edge trim 128 is installed on the composite molded roof 104. In a preferred embodiment, the mounting member 102 is configured to be bonded to the composite molded roof 104 and provided to an OEM assembly plant with the outer panel finished and the optional edge trim 128 installed.

Preferably, installing the edge trim 128 requires fitting a U-shaped profiled portion over the downward edge 130 of the roof panel. Adhesive, rivets, or other suitable mechanical fasteners can additionally be used without departing from the scope of the present invention.

At 208, structural adhesive 118 is applied, e.g., at the assembly plant, to the top of the attachment flange 116 of the body side ring assembly 106 and/or lower flange 114 of the mounting member 102.

At 210, datum location features are used to locate the roof 104 within the opening both cross-car and fore-aft. These datum locations features are typically studs, screws, rivets and the like used to align to key features on the vehicle body side ring assembly 106. The positioned roof 104 in the desired location leaves the gap 122 of predetermined width, however, the size of this body-to-roof gap is significantly smaller and eliminates the need for roof ditch moldings. The installed optional edge trim 128 will close out the small gap 122 remaining at the edge of the roof 104.

Optionally, at 212, a plurality of retention clips 132 (see FIG. 5), e.g., spring metal retention clips, that are removable are applied to hold the positioned roof in its position while the adhesive cures. Once cured, the adhesive 118 is the primary structural retention. Optionally, at 214, screws or other mechanical fasteners are additionally used to retain the mounting member 102 to the attachment flange 116, e.g., if added retention is deemed necessary based on the application.

Since the vehicle body flange can vary quite significantly, a molded or stamped mounting bracket is considered beneficial, by way of non-limiting example. In addition, since mass targets and potential read through of the bond line are considered high priorities, using carbon fiber epoxy laminate to form the channel is considered beneficial, by way of non-limiting example. This channel maintains a constant adhesive joint thickness along the roof to channel joint (structural adhesive 124 in FIG. 4), and is targeted at the same thickness along the lower flange, except for areas of minimal offset increase to allow fore-aft location adjustment without interfering to the body sheet metal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roof attachment system for a vehicle, comprising:
   at least one mounting member having a predetermined cross section;
   an upper flange of each mounting member shaped to match an inside surface of a roof of the vehicle, said upper flange bonded to the inside surface by a structural adhesive;
   a lower flange of each mounting member bonded to an attachment flange of a body side ring assembly by the structural adhesive, where bonding the at least one mounting member connects the roof to the body side ring assembly of the vehicle.

2. The roof attachment system of claim 1, wherein said roof is a composite molded roof and the mounting member is a molded or stamped bracket.

3. The roof attachment system of claim 1, further comprising a gap generally disposed between the roof and body side ring assembly.

4. The roof attachment system of claim 3, further comprising an edge trim coupled to the roof to close out the gap between the roof and the body side ring assembly.

5. The roof attachment system of claim 4, wherein the edge trim is extruded thermoplastic vulcanizate.

6. The roof attachment system of claim 1, wherein the cross section of the mounting member is a uniform cross section C-shaped channel.

7. The roof attachment system of claim 1, wherein the mounting member is C-shaped.

8. The roof attachment system of claim 1, further comprising a plurality of retention clips that are selectively removable, where the plurality of retention clips help retain the plurality of mounting members in position against the attachment flange of the body side ring assembly while the structural adhesive cures.

* * * * *